US008428975B2

(12) United States Patent
Burton et al.

(10) Patent No.: US 8,428,975 B2
(45) Date of Patent: Apr. 23, 2013

(54) INSURANCE PRODUCT MODEL-BASED APPARATUS AND METHOD

(75) Inventors: James Michael Burton, San Francisco, CA (US); Benjamin Buendia Eloy, Palo Alto, CA (US); Kenneth William Branson, Los Altos, CA (US)

(73) Assignee: Guidewire Software, Inc., Foster City, CA (US)

( * ) Notice: Subject to any disclaimer, the term of this patent is extended or adjusted under 35 U.S.C. 154(b) by 146 days.

(21) Appl. No.: 12/959,553

(22) Filed: Dec. 3, 2010

(65) Prior Publication Data

US 2011/0145022 A1      Jun. 16, 2011

Related U.S. Application Data

(63) Continuation of application No. 11/349,456, filed on Feb. 7, 2006, now Pat. No. 7,885,831.

(60) Provisional application No. 60/756,840, filed on Jan. 5, 2006.

(51) Int. Cl.
*G06Q 40/08* (2012.01)
(52) U.S. Cl.
USPC .................................. 705/4; 705/35
(58) Field of Classification Search ........................ 705/4
See application file for complete search history.

(56) References Cited

U.S. PATENT DOCUMENTS

| 5,655,085 | A | 8/1997 | Ryan et al. |
| 2004/0143464 | A1 | 7/2004 | Houle et al. |
| 2007/0156463 | A1 | 7/2007 | Burton et al. |
| 2007/0214020 | A1* | 9/2007 | Srinivasan et al. ............... 705/4 |
| 2011/0066454 | A1* | 3/2011 | Rosauer et al. .................. 705/4 |

OTHER PUBLICATIONS

"Data Pump Export"; Oracle Database Utilities 10g Release 2; 1996.

* cited by examiner

*Primary Examiner* — Jagdish Patel
(74) *Attorney, Agent, or Firm* — Van Pelt, Yi & James LLP

(57) ABSTRACT

An insurance product model comprising insurance policy metadata is provided (101) in a computer memory. The insurance policy metadata may comprise, at least in part, data that describes information that comprises a given corresponding insurance policy. A computer then serves to substantively interpret (102) this insurance product model to facilitate obtaining supplemental policy-specific data. The supplemental policy-specific data and the insurance policy metadata comprise separate and discrete data models and may, if desired, be stored (103) separately from one another. So configured, these teachings further support using (104) the insurance product model and the supplemental policy-specific data to facilitate an insurance-related action.

37 Claims, 9 Drawing Sheets

INSURANCE PRODUCT MODEL-BASED APPARATUS AND METHOD

RELATED APPLICATIONS

This application is a continuation of co-pending U.S. patent application Ser. No. 11/349,456, entitled INSURANCE PRODUCT MODEL-BASED APPARATUS AND METHOD filed Feb. 7, 2006 which is incorporated herein by reference for all purposes, which claims priority to U.S. Provisional Application No. 60/756,840, entitled INSURANCE PRODUCT MODEL-BASED APPARATUS AND METHOD filed Jan. 5, 2006 which is incorporated herein by reference for all purposes.

TECHNICAL FIELD

This invention relates generally to insurance products.

BACKGROUND

Insurance policies are known in the art and comprise complex legal agreements that specify items to be afforded coverage with respect to particular perils. Numerous conditions typically apply including applicable deductibles, coverage limits, and so forth. Modern insurance policies also often include expense/billing information that breaks down the total cost of the agreement into elements by covered item and peril.

Insurance carriers often view such policies as being derived from and related to a "policy product". A policy product defines the attributes and shared data for its derived policies. The process of writing a specific policy involves referring to the available attributes of the policy as defined by the policy product and the corresponding selection of appropriate values for a given customer. For example, when writing a commercial package policy, the insurer will typically refer to a commercial package policy product to ascertain that such a policy contains coverage with respect to general liability, commercial property, and other more specialized kinds of coverage. The insurer then uses this information to facilitate capture of additional information to fully define the policy and price it.

Insurance policies are typically defined at various levels of granularity with a collection of coverages typically comprising a most basic level of resolution. A coverage comprises an obligation to pay for damages that are caused by a particular peril (or collection of perils). The obligation typically has corresponding financial limits and deductibles that circumscribe the insurer's responsibility for losses against that coverage. A policy's total cost is usually determined as a function of the aggregate cost of the policy's constituent coverages.

Coverages typically apply to risk units (that is, a thing or circumstance that may be exposed to loss). For example, risk units can comprise buildings, vehicles, personal property, on-going business, or the like. At a higher level, coverages and associated risk units are grouped together to form a "policy line," which describes a set of coverages that apply to a particular business operation. In the insurance industry, policy line is often used interchangeably with "line of business," however, the term "policy line" will be used herein for consistency. A policy product comprises one or more policy lines. Typical policy lines include, but are not limited to, personal auto, general liability, commercial property, inland marine, and so forth.

Insurance policies are drafted in relatively high volumes. At the same time there can be considerable diversity with respect to the particulars of such policies. Word processing and other software-based applications have been helpful to facilitate the provisioning of insurance policies but have not fully addressed the needs of the industry. Policy product definitions are typically used to facilitate the drafting of a new policy, by providing a reference for the attributes of a policy. If the policy product is represented in a computer software application at all, it is usually hardcoded into a corresponding policy administration application. That is, such a system will typically directly encode the coverages, risk units, and policy lines into program code. In a typical implementation each kind of risk unit, coverage, and policy line has its own separate database tables, screens, and processing logic.

Such an approach presents several drawbacks. This approach does not support managing new policy lines, coverage types, or risk units that are not already hardcoded into the system. Instead, such new information must itself be specifically encoded into each and every instance where applicability is sought. As a result, even relatively small changes can require extensive software changes. This can be time consuming and expensive. This approach also carries considerable risk as the very act of making such coding changes presents a risk to the existing product definition as it is currently programmed.

BRIEF DESCRIPTION OF THE DRAWINGS

The above needs are at least partially met through provision of the insurance product model-based apparatus and method described in the following detailed description, particularly when studied in conjunction with the drawings, wherein:

FIG. 7 comprises an illustrative screen shot as configured in accordance with various embodiments of the invention;

FIG. 8 comprises an illustrative screen shot as configured in accordance with various embodiments of the invention;

FIG. 9 comprises an illustrative screen shot as configured in accordance with various embodiments of the invention; and FIG. 10 comprises an illustrative screen shot as configured in accordance with various embodiments of the invention.

Figure 1:
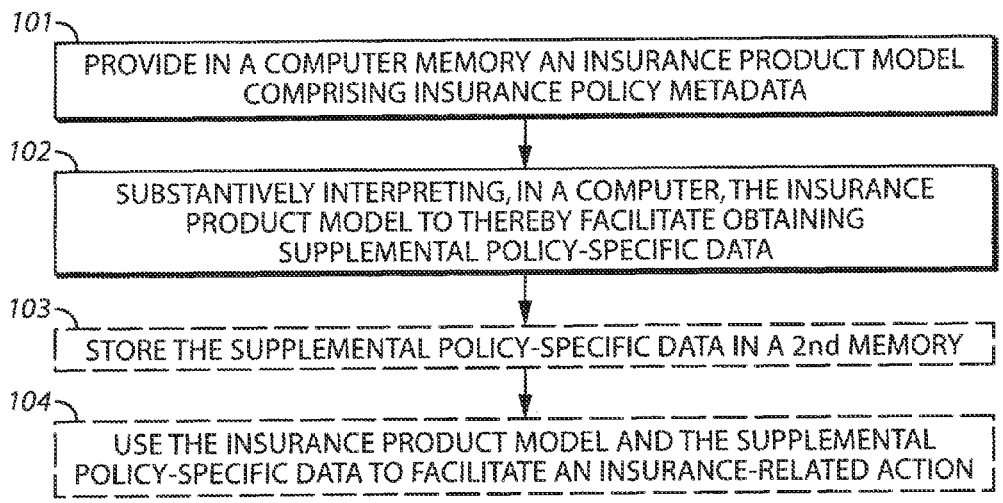
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, an insurance product model comprising insurance policy metadata is provided in a computer memory. A computer then serves to substantively interpret this insurance product model to facilitate obtaining supplemental policy-specific data. As used herein, "model" will be understood to refer to metadata that defines the structure of a plurality of derived policies. Note that while the model may contain information that forms part of the information included in the derived policies, it is distinct from, and shared across, all of the derived policies.

By one approach, the insurance policy metadata comprises, at least in part, data that defines elements of a corresponding insurance policy. Examples of metadata include, but are not limited to, data that defines policy lines, risk unit types, insurance coverage types, insurance coverage forms, contractual terms associated with insurance coverages ("coverage terms"), options associated with coverage terms, available endorsements, available choices for limits and deductibles, information about the availability of coverages, and so forth.

The supplemental policy-specific data can comprise information such as, but not limited to, actual coverage limits and coverage deductibles selected, coverage elections, risks being covered, a period of coverage, cost(s), applied endorsements, insured entity data, and so forth. By one approach the insurance policy metadata and the supplemental policy-specific data comprise separate and discrete data models and may, if desired, be stored separately from one another.

So configured, these teachings further support using the insurance product model and the supplemental policy-specific data to facilitate an insurance-related action. Examples of insurance-related actions include, but are not limited to, creating a new insurance policy, determining whether an insurance policy provides coverage with respect to a particular event, collecting additional information with respect to a particular event, identifying at least one insurance policy that is available to offer to an entity from amongst a plurality of candidate insurance policies, providing information to a user regarding which risk units are permitted to be covered by a given corresponding insurance policy, and so forth (to note but a few examples).

Those skilled in the art will appreciate that these teachings readily support managing new policy lines, coverage types, or risk units without requiring reprogramming of a hardcoded policy product embedded in the software code of a policy administration application. Instead, such new information may be incorporated into insurance product model metadata, which metadata is then interpreted and used to collect additional policy-specific information, and which may further facilitate performing an insurance-related action. This, of course, can be accomplished with a great reduction in time and effort and with considerably reduced exposure to coding mishaps.

These and other benefits may become clearer upon making a thorough review and study of the following detailed description. Referring now to the drawings, and in particular to FIG. 1, a given enabling method 100 will provide 101 in a computer memory an insurance product model comprising insurance policy metadata. As used herein, "model" will be understood to refer to metadata that defines the structure of a plurality of derived policies. Note that while the model may contain information that forms part of the information included in the derived policies, it is distinct from, and shared across, all of the derived policies.

The insurance policy metadata may comprise, at least in part, data that defines elements of a corresponding insurance policy. The insurance policy metadata may also comprise, at least in part, data that is common to a plurality of derived insurance policies. Examples of metadata include, but are not limited to, data that defines a policy line (that is, a set of related risk types and coverages that, taken together, make up a coherent package of insurance), at least one risk unit type (that is, a thing or circumstance that may be exposed to loss, which may also include, for example, the parameters needed to correctly represent that risk type for purposes of determining coverage and calculating the premium), insurance coverage types (that is, a set of types of available coverage, which may also include, for example, the parameters needed to determine the possible values of limits and deductibles), insurance coverage forms, and so forth.

In addition, the insurance policy metadata may include contractual terms associated with insurance coverages. The contractual terms that can define the insurance policy metadata may comprise coverage limits, coverage deductibles and/or elective coverage options (that is, any configurable option of the coverage (such as, for example, whether a liability coverage includes actions taken by house guests in addition to actions taken by members of the household) that may be selected and may affect the scope of the coverage and the price to be charged). In addition, the insurance policy metadata may also include options associated with coverage terms or an available endorsement. The options associated with coverage terms may comprise a set of available coverage limits and/or available deductibles to choose from. The insurance policy metadata may further comprise information regarding availability of at least one item of insurance policy metadata as a function of at least one of a given jurisdiction, a given date or a given underwriting entity. For example, a specific coverage may only be available in a certain jurisdiction. Therefore, the insurance policy metadata would include information as to the availability of the specific coverage as relates to a plurality of jurisdictions.

The insurance product model may also comprise a multi-line or "package" policy model. For example, the insurance product model can be used to create a plurality of distinct policies by choosing appropriate policy-specific data. As another example, the insurance product model may contain information about multiple lines of coverage, which can then be combined in various ways to make up "package" policies.

Figure 3:
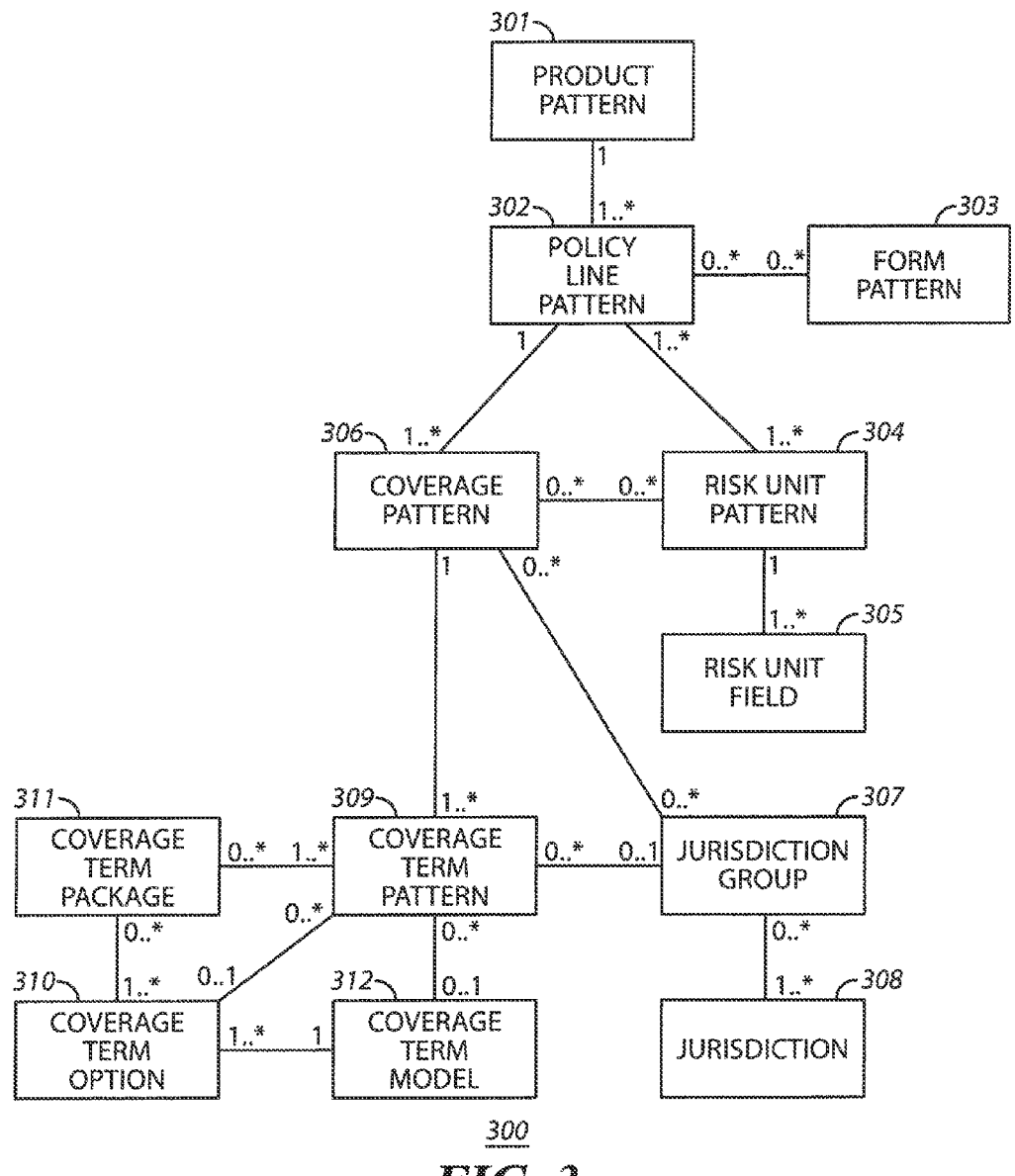
FIG. 3 comprises an entity relational diagram as configured in accordance with various embodiments of the invention.

Referring now to FIG. 3, a product model 300 is expressed as an entity relational diagram. Such a diagram will be familiar to those skilled in the art as the representation of the structure of a relational database. In this embodiment, each product in the product model 300 consists of a row in the Product Pattern table 301. A Product Pattern has a 1-to-many relationship with rows in the Policy Line Pattern table 302, meaning that each product is made up of one or more policy lines.

Rows in the Policy Line Pattern table 302 also have a 1-to-many relationship with rows in the Form Pattern table 303, meaning that each policy line has one or more associated forms. Each form pattern row describes a given form to be included in the final written contract, and includes information about the conditions under which the form is required.

Similarly, a Policy Line Pattern 302 has a many-to-many relationship with Risk Unit Patterns 304. The set of Risk Unit Patterns 304 associated with a Policy Line Pattern 302 determines the kinds of risk units that may be covered under the policy (for example, buildings, automobiles, etc.). Each different Risk Unit Pattern 304 defines the name of the risk unit and the set of Fields 305 needed to fully describe the risk unit. For an automobile, for example, the required fields could include Make, Model, Year, VIN, and License Plate. By one approach, the fields are listed in a metadata document that describes, for each risk unit type, the name of each field and its data type. When the product model is interpreted to present a user interface for entering information about the risk unit, these field descriptions can be used to prompt the user to enter the appropriate set of fields.

Continuing with the product model 300 of FIG. 3, the Coverage Pattern table 306 describes the possible coverages that make up a policy. Note that the Coverage Pattern table 306 has relationships with the Policy Line Pattern table 302, and the Risk Unit Pattern table 304, which correspond to the two levels at which coverages may be present on a policy. Coverages may be present at the line level (providing general coverage as a whole for the policy, such as third-party liability coverage on an automobile policy). Coverages may also apply at the risk unit level (providing coverage with respect to a particular vehicle, for example). Those skilled in the art will appreciate that the indicated relationships can be represented efficiently by a combination of direct foreign keys and indirect (i.e., via a join table) foreign keys to provide the ability for multiple coverage patterns to be associated with a particular risk unit type, for example.

The Coverage Pattern table 306 also has a relationship with the Jurisdiction Group table 307, which in turn has a relationship with the Jurisdiction table 308. Jurisdiction groups aggregate a plurality of possible jurisdictions (commonly states, but other jurisdiction units are possible). It should be noted that the relationship between Coverage Pattern 306 and Jurisdiction Group 307 is optional; if not specified, it is assumed that the coverage pattern applies independently of jurisdiction.

Those skilled in the art will appreciate that this set of relationships, along with information attached to the relationship itself (by means of a join table, not shown in the diagram), provide a means to associate coverage patterns flexibly with the policy, such that coverages may be applied based on the policy as a whole or based on the presence of a particular risk unit. Furthermore, based on the jurisdiction of the policy, it may be clearly seen that the coverages associated with that jurisdiction may be identified, and the appropriate inclusion requirements applied (e.g., requiring the coverage to be automatically added or preventing the coverage from being added).

Continuing with FIG. 3, a Coverage Pattern 306 comprises a plurality of Coverage Term Patterns 309. Each Coverage Term Pattern 309 can be one of three mutually exclusive types: a direct coverage term, an option coverage term, or a package coverage term. The coverage term type is indicated by the value of a Coverage Term Usage Type field in the Coverage Term Pattern table 309, which can take one of the above three values. The three coverage term types comprise the necessary elements, when taken in combination, to completely define the terms of a given coverage. The main function of a coverage term is to provide a means to represent a single value with respect to an aspect of the coverage, such as a dollar value for a deductible. It should be noted that a "single value" may in fact be a "package" of related values, as will be described in detail below. Each Coverage Term Pattern 309 may also define additional information to assist in prompting the user to populate the necessary values, such as a means to present a description string to the user. The Coverage Term Pattern 309 may also include an optional default value to be used if a value for the coverage term is not provided by another means.

The simplest form of a coverage term is a direct coverage term. This type of coverage term simply defines a single decimal numeric value. The Coverage Term Pattern 309 is treated as a direct coverage term if its Coverage Term Usage Type indicates "Direct Coverage Term". When the coverage is selected, a coverage term will be created to hold the value as obtained from the user or another source. The value may also be defined, as described above, by using the default value specified in the Coverage Term Pattern 309. A typical example of using a direct coverage term is to specify the actual cash value of a building as the limit for a coverage.

The option form of a coverage term provides for the ability to specify a term value as one value from a plurality of discrete values. The Coverage Term Pattern 309 is treated as an option coverage term if its Coverage Term Usage Type indicates "Option Coverage Term". The option coverage term is typically used for preset limits and deductibles such as, for example, to request a customer to choose a $100, $500, or $1000 deductible for collision damage. The option coverage term may also be used to represent non-numeric values, with options such as, for example, "yes"/"no" or "Accepted"/"Declined" or other similar options (it should be noted that the options are not necessarily limited to two choices).

The row for the Coverage Term Pattern 309 in the product model specifies the set of possible option values by indicating a value in a Coverage Term Option Group field, which references a plurality of individual option values in the Coverage Term Options table 310. The Coverage Term Options table 310 includes a matching Coverage Term Option Group field, indicating which option group the coverage term option belongs to. When prompting a user to select a value for the option coverage term, the list of presentable options can be queried for based on the option group, by querying for all options where the value defined in the Coverage Term Option Group field matches the value defined in the Coverage Term Option Group field on the coverage term pattern.

Finally, a package coverage term groups together multiple options into a single "package". The Coverage Term Pattern 309 is treated as a package coverage term if its Coverage Term Usage Type indicates "Package Coverage Term". The most common usage for this kind of coverage term is to group together limits or deductibles for different aspects of a coverage. It is common, for example, to define deductibles on an auto policy as 100/500/100, meaning a $100,000 limit for bodily injury liability per injured person (BI/person), a $500,000 limit for bodily injury liability for all injured persons in any one incident (BI/incident), and a $100,000 limit for physical damage liability to $3^{rd}$ party property (PD/incident). Other choices for these options could be, for example, 25/50/25 or 50/100/50. Note that multiple values are packaged together to make a single choice; this is done primarily to simplify the computation of prices. In the present embodiment, the product model specifies the set of possible package values by indicating a value for the Coverage Term Package Group field, which references a plurality of packages in the Coverage Term Packages table 311. In turn, each package is associated with a plurality of Coverage Term Option 310 rows, each of which has a foreign key back to its owning package and which corresponds to one value making up the package. For example, for a 50/100/50 package, the Coverage Term Package would link to three rows in the Coverage Term Option table: for 100,000 BI/person, 500,000 BI/incident, 100,000 PD/incident.

All three types of coverage term are further annotated by reference to data contained in the Coverage Term Model table 312. A direct coverage term has a foreign key to a row in the Coverage Term Model table 312. The coverage term options that make up the individual term values for option coverage terms and package coverage terms also have a foreign key to a row in the Coverage Term Model table 312. This structure means that every possible coverage term value (whether expressed as an option or a direct value) can be associated with a matching coverage term model. This table contains additional metadata describing the value of the coverage term. The additional metadata, in one embodiment, includes Model Type (whether the term represents a limit, a deductible, or other), Aggregation Type (indicating whether the term applies per incident, per person, per year, etc.), a Restriction Type (for example, a deductible only related to medical expenses, not lost wages), a Model Value Type indicating the units in which the value is expressed (money, boolean, account, number of days, number of employees, etc.), and descriptive text used when presenting the coverage term to the user.

Those skilled in the art will appreciate that a flexible structure of this type can be used to define a plurality of insurance policy products in a generic and configurable way. The elements of a policy can be determined by interpreting the relationships between the patterns. By providing a generic representation of a coverage and the terms that define it, the present embodiment provides for the creation of as many coverages as are necessary to completely define an insurance policy product. This structure also provides for the ability to define the possible coverage terms, including available options and default values, that would allow the coverage to be completely specified and priced as part of the policy.

By another optional approach, the product model may be represented using structured text data, such as extensible markup language (XML). In such an embodiment, the data defining the product model is contained in text documents. The data is structured so that it can be interpreted by using markup tags that can be used to identify the entries corresponding to the product patterns, policy line patterns, coverage patterns, and other metadata making up the product model. Those skilled in the art will appreciate how the tables and relationships presented in the relational database embodiment described above could equally be represented using nesting of elements and references between elements in an XML document. Note that although XML is the most common format for representing structured text information, other embodiments could easily be created to represent the structure defined above.

By another optional approach, portions of the product model could be encoded in a database format, while other portions could be encoded as structured text. The database format portions and the structured text portion would then be combined when the model is interpreted.

In another optional approach, the product model could be defined both as structured text and in database tables, with a facility to exchange data between the two representations. The advantage of such an embodiment would be to provide portability of the product model between databases. For example, the data could be exported to structured text files, and then moved to another database to move the product model from a test system to a production system. Export and import of data from a relational database is well understood by those skilled in the art, and many commercial tools exist to provide this functionality.

Upon being provided 101 with the insurance product model comprising insurance policy metadata, the insurance product model is then substantively interpreted 102, in a computer, to thereby facilitate obtaining supplemental policy-specific data. Examples of policy-specific data include, but are not limited to, information regarding coverage limits, coverage deductibles, coverage elections, risks being covered, a period of coverage, cost(s), elected coverages, applied endorsements, insured entity data, and so forth. Substantively interpreting 102, in a computer, the insurance product model to thereby facilitate obtaining supplemental policy-specific data may also comprise prompting a user to provide at least a portion of the supplemental policy-specific data. The user could then input the supplemental policy-specific data using any known computer input device.

Further, the insurance product model may be used in combination with the supplemental policy-specific data to define a corresponding insurance policy that comprises one of a plurality of candidate insurance products that correspond to the insurance product model. The insurance product model may be substantively interpreted 102, at least in part, by identifying a plurality of candidate products to offer to a customer, including providing a description of each product.

Figure 4:
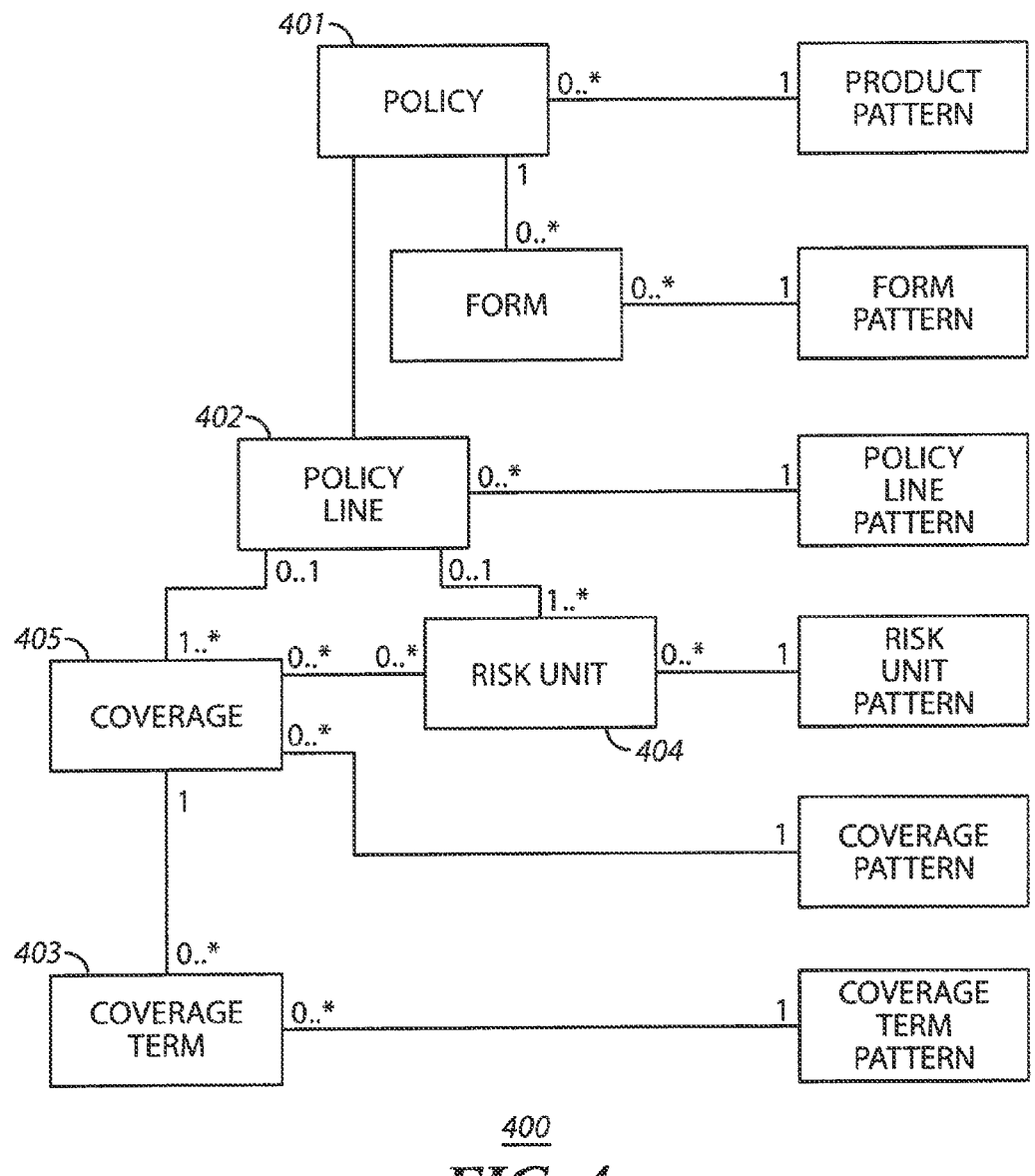
FIG. 4 comprises an entity relational diagram as configured in accordance with various embodiments of the invention.

Referring now to FIG. 4, an illustrative schematic is presented showing policy-specific data stored in a relational database. Using the same notation as in FIG. 3, a set of tables is presented that is similar, but not identical, in structure to the tables storing the product model. The tables storing the product model will be referred to as the "model tables" and the tables storing the policy-specific data will be referred to as the "instance tables". It should be noted that each of the instance tables has a foreign key relationship to the model table with which it is associated. For example, each row in the Policy instance table 401 (FIG. 4) is related to the row in the Product Pattern model table 301 (FIG. 3) for the product that defines the policy. When interpreting the policy-specific data together with the product model, the existence of these relationships allows for making use of information from both the instance data and the model data.

It is important to note that each product pattern will ordinarily be related to many policies. That is, each row in the product pattern table will usually be related to many rows in the policy table. The function of the product pattern is to define structure and contents for a plurality of policies. The same is true, for example, for a coverage pattern defining the structure and contents of a plurality of coverages. The instance tables store information about individual policies; the model tables store information that applies to all policies related to a particular product model.

Interpreting the product model to facilitate collecting additional policy-specific data will usually comprise determining appropriate values for the various elements of the policy as defined by the product model, and then storing those values in the instance tables (or other means of storing policy-specific data). In the current embodiment, for example, an initial step would comprise querying the Product Pattern Table 301 of FIG. 3 to determine the list of available products, and then presenting that list to the user to determine a particular product to be used when creating the policy. This would result in a new row being created in the Policy instance table 401 of FIG. 4. Next, the Policy Line Pattern table 302 of FIG. 3 would be queried to determine the set of policy lines making up the policy; a row for each policy line would be created in the Policy Line instance table 402 of FIG. 4, containing policy-specific information about that policy line. A similar procedure is followed to populate the policy-specific data required by the product model for the remaining instance tables. Specific details about the procedure for populating this policy-specific data are described below.

The insurance product model may be substantively interpreted 102, at least in part, by identifying specific coverages to include in a resultant insurance policy. Further, the substantive interpretation of the insurance product model may also comprise, at least in part, identifying specific coverages having a corresponding inclusion requirement as a function of another insurance policy circumstance. This other insurance policy circumstance may include, for example, at least one of a given jurisdiction, a given date, a given entity to be covered or a given underwriting entity. The corresponding inclusion requirement may comprise at least one of a mandatory inclusion, a mandatory exclusion, or an optional inclusion. For example, a specific coverage may only be available in a certain jurisdiction, or may be mandatory in some jurisdictions while optional in other jurisdictions. Therefore, the interpretation of the insurance product model would include the identification of those specific coverages that may be available and/or mandatory for a selected jurisdiction.

Referring again to FIG. 3, identifying specific coverages to include may be accomplished by querying the Policy Line Pattern table 302, the Coverage Pattern table 306, and the Risk Unit Pattern table 304 to determine which coverages should be included. The policy-specific data includes information about the policy lines in effect for the policy; all coverages directly linked at the policy line level can be easily retrieved by querying for Coverage Pattern 306 rows holding a foreign key to a Policy Line Pattern 302 row referenced by the policy. A similar query can be used to determine which coverage patterns should be included based on the risk units included in the policy. Once the coverage patterns have been identified, fields on each coverage pattern can be checked against policy-specific data to determine the inclusion requirement for the coverage. For example, if the policy-specific data indicates that the policy is being underwritten by a specific underwriting entity, an Underwriting Entity field on each coverage term pattern can be inspected to determine if it matches the policy-specific underwriting entity, and an inclusion determination made.

The insurance product model may be substantively interpreted 102, at least in part, by identifying which coverages are suggested for inclusion (whether mandatory or optional) and which coverages are available as additional coverages only by specific user request. For example, comprehensive coverage for a vehicle is commonly suggested even when optional (such as when Accept/Decline options are provided), but a less common coverage for damage or theft to valuable electronic equipment would be added only if the user selected it from a list of additional coverages and explicitly added it to the policy.

The insurance product model may also be substantively interpreted 102, at least in part, by identifying specific risk units to include in a resultant insurance policy. This step will identify those items or circumstances that may be exposed to loss. In addition, the substantive interpretation 102 may involve identifying the information required to describe and evaluate each risk unit. The substantive interpretation 102 of the insurance product model may also comprise, at least in part, identifying specific policy lines to include in a resultant insurance policy.

Substantively interpreting 102 the insurance product model may also comprise, at least in part, identifying coverage terms to specify for a coverage. These terms may include, as an example, limits to apply to the coverage or the deductible amount. The substantive interpretation 102 of the insurance product model may also involve identifying the options that are available when specifying terms for a coverage.

The insurance product model may further be substantively interpreted 102, at least in part, by identifying which forms should be used to comprise a corresponding policy contract document. This contract document is generally composed from a set of forms. Therefore, the interpretation of the insurance product model will identify those forms which should be included in the text of the written form of the policy contract document.

Figure 7:
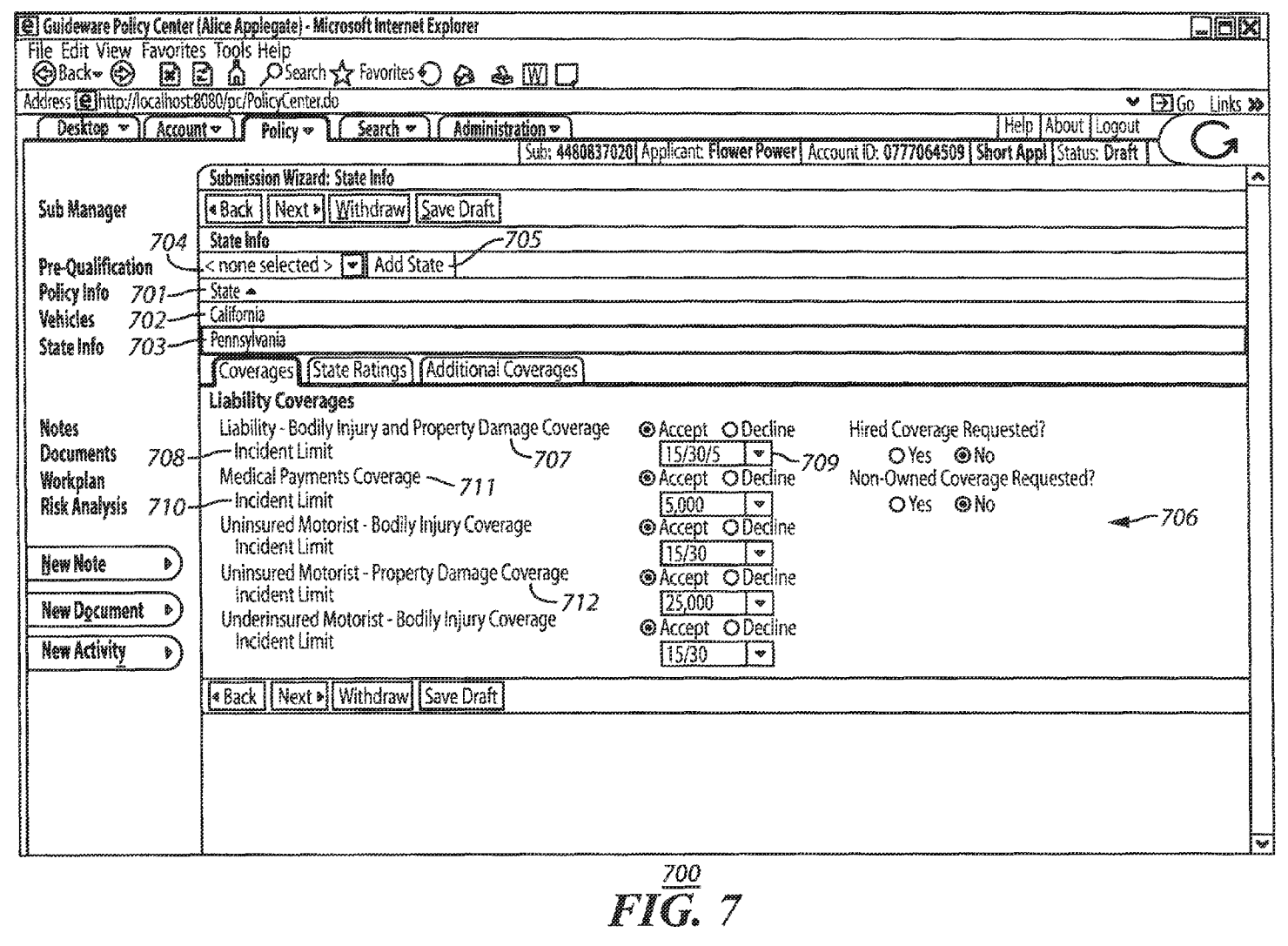

Referring to FIG. 7, an illustrative screenshot of a user interface 700 demonstrates how the current embodiment uses and interprets information in the product model (such as in FIG. 3) to gather appropriate policy-specific information, which can then be stored in the instance tables (such as in FIG. 4). In the illustration, a user is being prompted to enter policy-specific information at the policy line level for a specific jurisdiction. Note that the user interface provides a means to establish the current jurisdiction by selecting from a list of jurisdictions under the "State" heading 701. In this illustration, California 702 and Pennsylvania 703 are the currently listed jurisdictions. Additional jurisdictions may be added by selecting from a list of jurisdictions (in this illustration, the jurisdictions are states) in a jurisdiction drop-down control 704 and then selecting the "Add State" button 705. In this illustration, the user has selected the state of California 702 as the jurisdiction. The product model is then interpreted to find all policy line level coverages relevant to the "California" jurisdiction. These coverages are listed in a coverage display area 706 with a descriptive label as defined in the product model. Listed with each coverage are the terms to be specified for the coverage, determined with reference to the Coverage Pattern and Coverage Term Pattern model tables. In the current illustration, only a single term is shown for each coverage, but those skilled in the art will appreciate how multiple terms could be listed for each coverage.

Considering now the "Liability—Bodily Injury and Property Damage Coverage" coverage 707, an "Incident Limit" term 708 is provided. A drop-down control 709 lists the current (default) choice of 15/30/5, indicating that this is a package coverage term bundling three limit values into a single menu choice. Upon clicking on the drop-down control 709, the user would be presented with the other combinations defined by the package coverage term. The process, in the current embodiment, for presenting this list involves first finding all coverage terms associated with the coverage by executing a database query to find all coverage term patterns associated with the coverage pattern associated with this coverage. For the single coverage term found, the Coverage Term Usage Type field communicates to the system that this Coverage Term Pattern is a "Package Coverage Term". To determine, in turn, the list of menu items to present in the drop-down control, the system uses the Coverage Term Package Group field (along with jurisdictional restrictions and other filtering attributes) to determine the list of available packages and displays the Label field for each package.

Those skilled in the art will have little difficulty traversing the relationships described in the product model representation using standard database query techniques, to determine the values to present for the coverage term. When the user selects one of the menu items, the foreign key for the coverage term pattern is stored as the value of the coverage term in the Coverage Term instance table 403, as shown in FIG. 4. This is policy-specific data; a different policy will likely have a different choice recorded for this coverage term, representing a different choice of incident limits. At any time, the choice of a particular option group (policy-specific data) can be combined with the product model metadata to determine the actual value of the options chosen, for use when interpreting the policy-specific data and the product model in order to perform an insurance action.

The illustration of FIG. 7 also shows other types of coverage terms. The "Incident Limit" term 710 for the "Medical Payments Coverage" 711 is an option coverage term, in which a list of single values is presented in a drop down list. Those skilled in the art will appreciate how a procedure similar to that described for the package coverage term can be used to determine the set of possible values from the product model to present to the user, and how the selected value may be recorded in the Coverage Term instance table 403 of FIG. 4. A direct coverage term is not illustrated, but those skilled in the art will understand how to collect and store a simple numeric value in the instance table.

Figure 8:
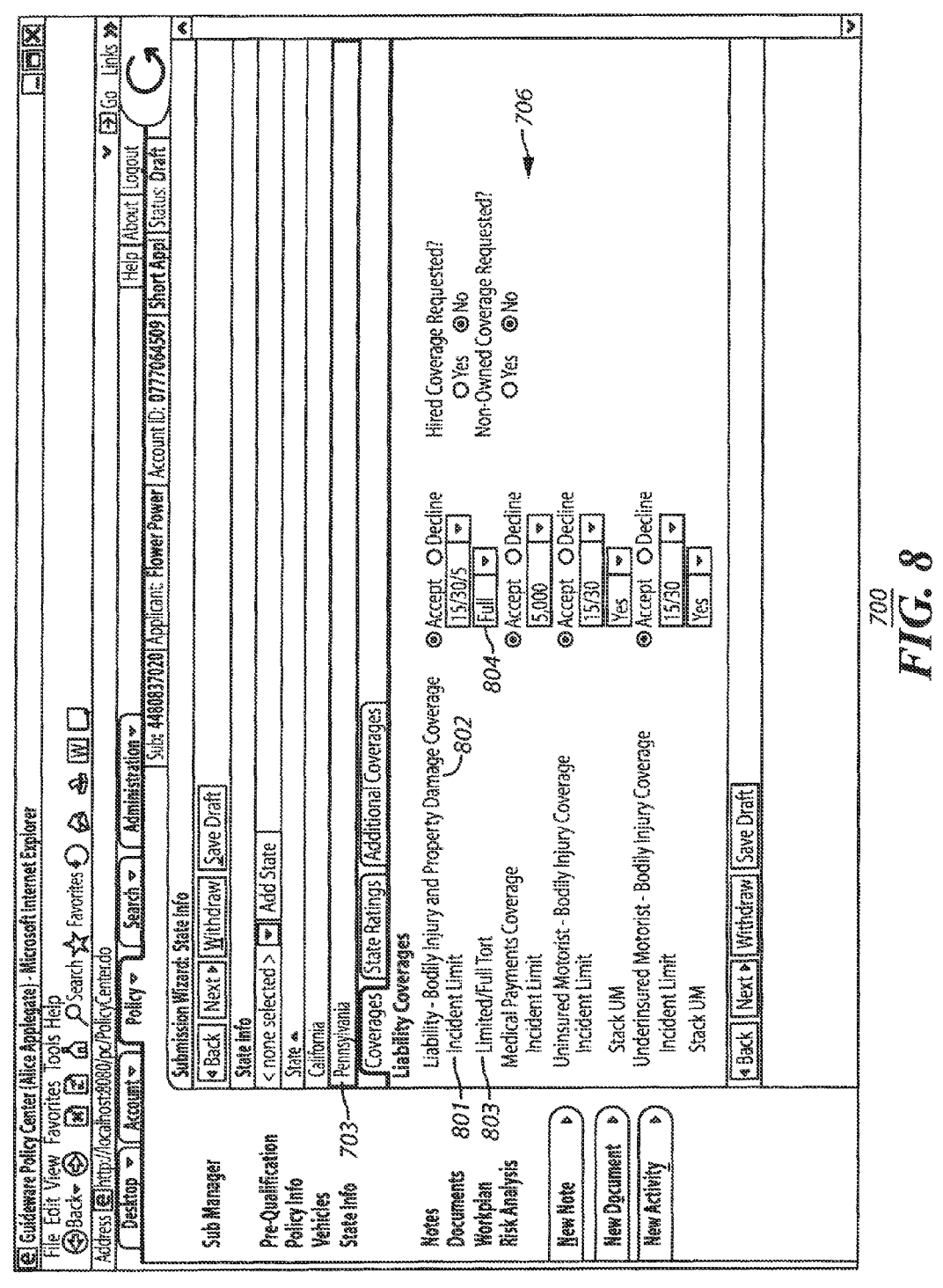

Turning now to FIG. 8, the user has now selected "Pennsylvania" 703 as the jurisdiction and may now fill out information for policy line-level coverages as applicable in the state of Pennsylvania (note that the current jurisdiction has changed). The "Incident Limit" 801 term for the "Liability—Bodily Injury and Property Damage Coverage" 802 coverage remains unchanged, but now we see that there is a new coverage term, "Limited/Full Tort" 803, showing a currently selected value of "Full" in the drop-down control 804. If the user were to click on the drop-down control 804, the user would see an alternative choice of "Limited". This coverage term applies only in the "Pennsylvania" jurisdiction. By interpreting the product model, and determining the dependency between Coverage Term Pattern and Jurisdiction Group, it was possible to determine that an additional coverage term value must be captured. Referring again to FIG. 7, notice also that California has an additional coverage, "Uninsured Motorist Property Damage Coverage" 712, which is not available in Pennsylvania, as shown in FIG. 8. It can be readily appreciated that as the regulations in different jurisdictions change, it will be possible to update the data in the product model to deliver correct behavior in the screens collecting information from the user, without the need to perform expensive and risky re-programming.

Figure 9:
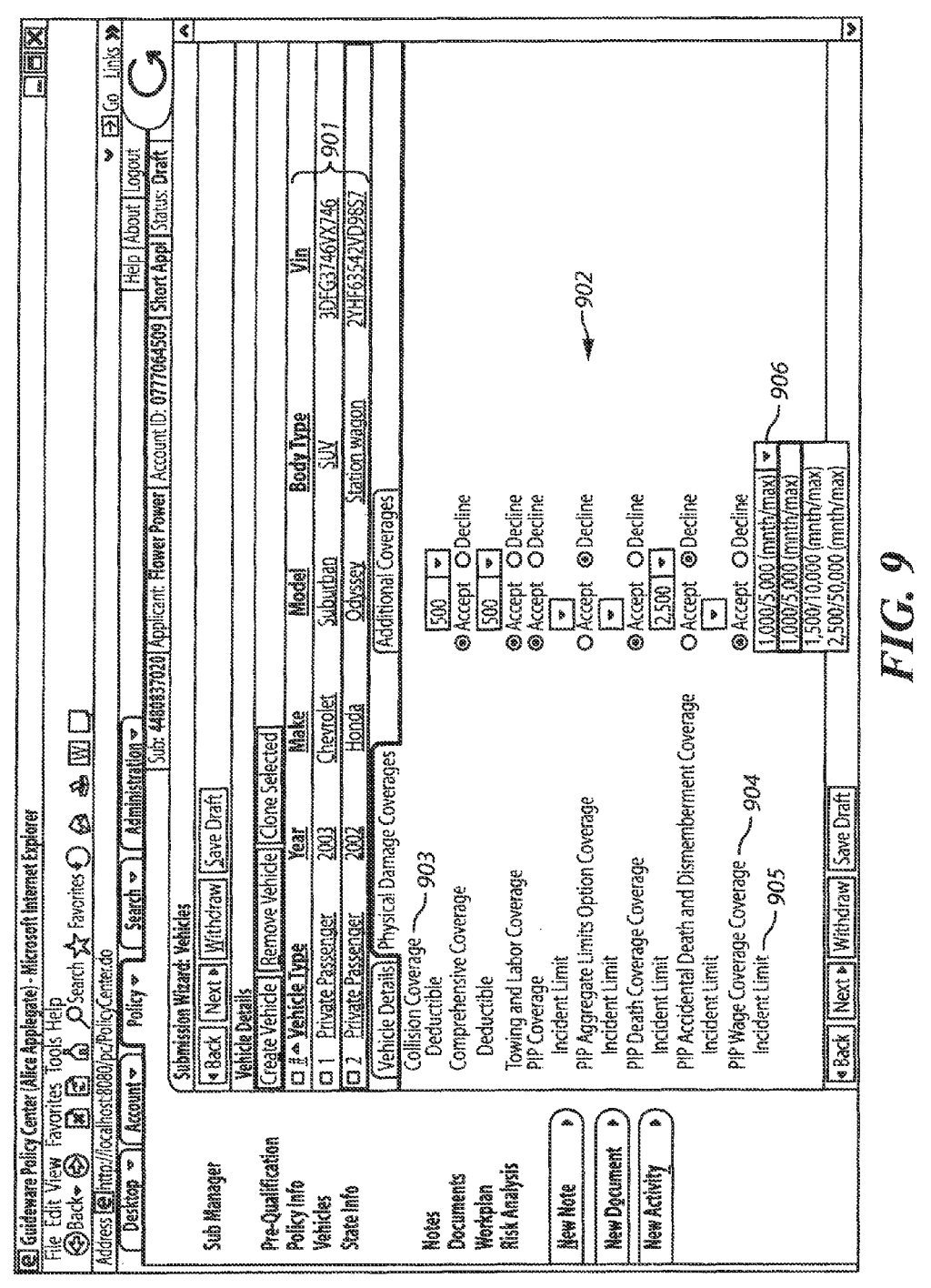

Considering now FIG. 9, an illustrative screenshot displays coverage options for a risk unit. In this product pattern, the risk units 901 are vehicles, with two risk units being listed. One row for each risk unit specified in the policy-specific data will be stored in the Risk Unit instance table 404, as shown in FIG. 4. Referring again to FIG. 9, when a vehicle from the list is selected, a list of coverages with associated coverage terms is presented in a coverage display area 902. It should be noted that these coverages are different from those that apply at the level of the policy line; these coverages are applicable only to the specific vehicle selected. Referring again to the product model in FIG. 3, the relationship between Risk Unit Patterns 304 and Coverage Patterns 306 allows a particular policy line pattern to determine the list of coverages to present for a particular risk unit type (in the case of FIG. 9, a vehicle). Referring again to FIG. 9 and considering the "Collision Coverage" 903 for a selected vehicle from the risk unit list 901, this coverage is required as there is no "Accept/Decline" choice available. The mandatory nature of this coverage can be determined by inspecting the "required" column on the Coverage Pattern table 306 of FIG. 3 for the specific coverage pattern in question. As each coverage is elected or declined by the user, the choice will be stored in the Coverage instance table 405, as shown in FIG. 4.

FIG. 9 also illustrates the range of values provided for a package coverage term. The range of choices for the "Incident Limit" 905 term of the "PIP Wage Coverage Coverage" 904 is shown in a open drop-down control 906. The user may then select the appropriate range from the list of provided options.

Figure 10:
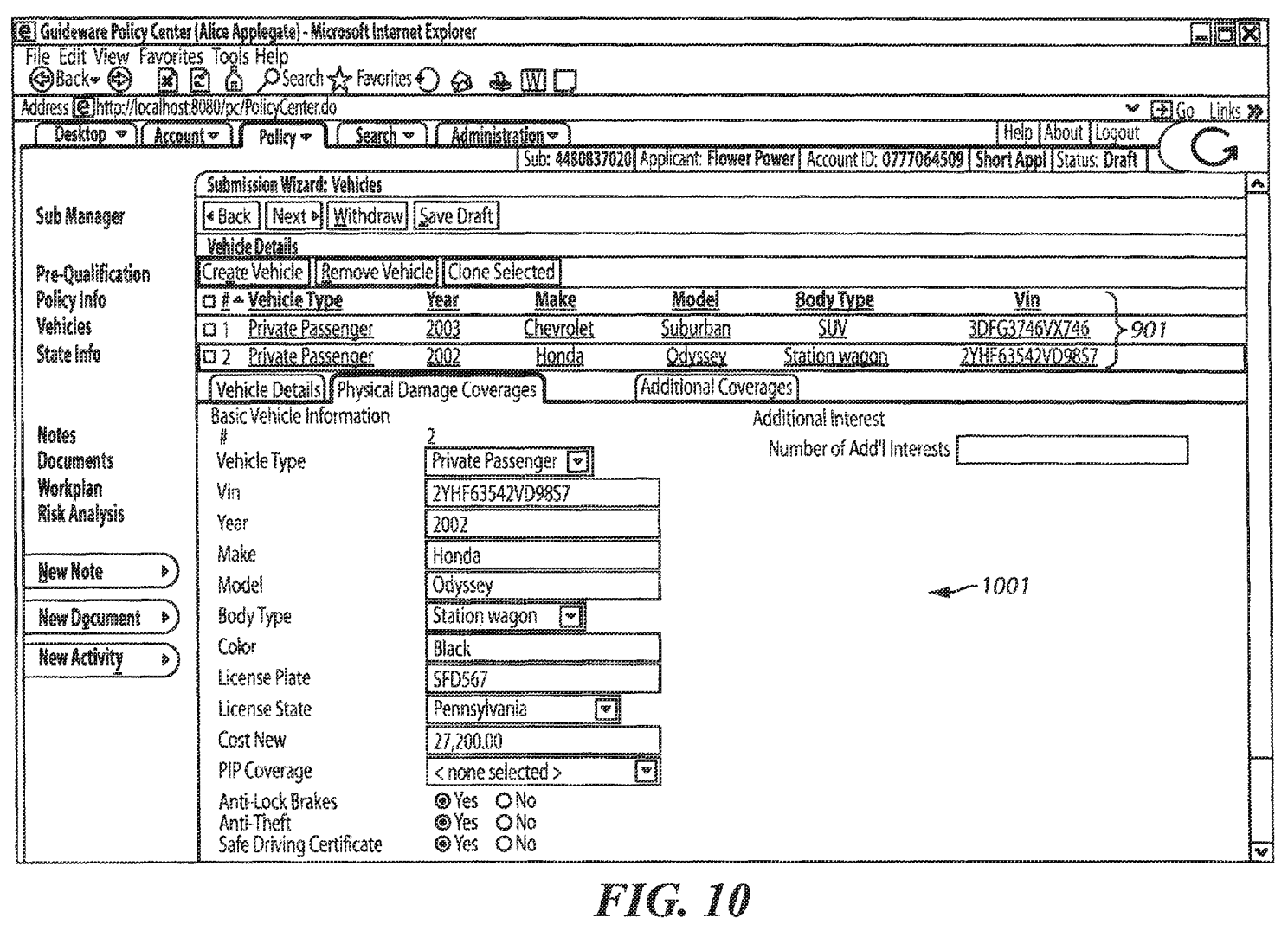

FIG. 10 shows how the risk unit pattern can be queried to determine the fields of data to be captured when describing a particular type of risk unit. Again, the risk units 901 in this product pattern are vehicles, with two risk units being listed, and the details for a selected vehicle (in this case, vehicle #2) being presented in a display area 1001. The details show all of the fields, with a descriptive label and an appropriate control for entering data of the required type. Those skilled in the art will appreciate how a list of fields, descriptions, and associated data types as defined by the product model could be used to render a screen as shown. In the current embodiment, the policy-specific data about each vehicle is stored in the Risk Unit instance table (see FIG. 4) which contains a superset of all columns defined for all different risk unit types, and a foreign key to the risk unit pattern for the given risk unit. When operating on the vehicle data, the risk unit pattern is first queried to determine the set of fields to be read or written, and those fields are requested from the Risk Unit instance table in the retrieval query, ignoring any fields relevant only to other risk unit types. As a result, any risk unit can be represented in a single row in the table, with strongly typed data fields. Those skilled in the art will appreciate that other embodiments may exist to implement the use of a product model to define the types of risk units and the fields to be captured, and then to interpret that data to collect appropriate policy-specific data from the user.

Upon substantively interpreting 102 the insurance product model to facilitate obtaining supplemental policy specific data, the supplemental policy-specific data may then be stored 103 in a second computer memory. Those skilled in the art will appreciate that the supplemental policy-specific data and the insurance product model are functionally discrete and, as a result, the supplemental policy-specific data and the insurance product model are represented by different and separate data models. In addition, the second computer memory may be physically and logically discrete with respect to the insurance product model.

The insurance product model and the supplemental policy-specific data may then be used 104 to facilitate an insurance-related action. The insurance-related action may comprise, for example, creating a new insurance policy. In the process of creating a new policy, the product model can be used in conjunction with the policy-specific data to compute a total price to be charged for the policy. The price is typically computed as the sum of the prices for the individual coverages (with, usually, some adjustments such as a "good driver" discount). To determine the price for a coverage, a calculation is performed that refers to the product model to determine the actual values of the terms as specified in the policy-specific data. The details of these calculations are proprietary to individual insurers and are outside the scope of the present invention. However, in that they depend on knowing the values of the coverage terms, they are facilitated by interpreting the product model in combination with the policy-specific data to provide accurate inputs to the calculations. It should be noted that the benefit of the described method becomes clear when considering that changes to the values of the available coverage term options in the product model will be automatically reflected in the pricing of policies derived from that model.

Another aspect of creating a new policy that is facilitated by the described method is the issuance step. In this step, the contract language of the policy is created to provide a permanent record of the contract terms. A key part of creating the contract language is writing out a description of each coverage and its coverage terms. The language describing the coverages on the policy is typically included in the standard forms associated with the policy lines that make up the policy. In addition, the form entries can specify a mapping to indicate where policy-specific data should be inserted into the form language to fill in variable fields. For each included coverage, where inclusion is determined by examining the policy-specific data stored in the Coverage instance table 405 (see FIG. 4), the corresponding coverage pattern in the product model is referenced to determine the coverage terms. Then, for each coverage term on the coverage, the corresponding coverage term pattern and coverage term options are queried from the product model to determine the actual term values to use. A benefit of the described method, as in the case of pricing, is that the coverage descriptions and the values of the coverage terms are specified in the product model. Therefore, changes in the product model will be automatically and correctly used for purposes of pricing and issuing the policy. Those skilled in the art will appreciate that similar actions, not described herein, may be facilitated by means of interpreting the product model and combining the product model policy metadata with the policy-specific data for a given policy.

By another optional approach, the insurance-related action may comprise determining whether an insurance policy provides coverage with respect to a particular event. In addition, the insurance-related action may also comprise collecting additional information with respect to a particular event. Therefore, the insurance product model and the supplemental policy-specific data may be used to determine coverage, and may also be used to identify the information that should be collected (or not collected) when a particular event occurs.

Further, in determining whether an insurance policy provides coverage with respect to a particular event, the insurance policy metadata may comprise, at least in part, loss-coverage mapping information. Therefore, collecting additional information with respect to a particular event may comprise using the loss-coverage mapping information to facilitate collecting event-specific data to thereby facilitate determining corresponding coverage and payment. As a result, the product model can determine the possibly applicable coverages and liabilities. As an example, if an automobile is damaged in an auto accident, the product model can be referred to in order to determine possibly applicable coverages. If, for example, the product model determines that the insured person has liability coverage for third party property damage, information can then be collected as to whether another vehicle was damaged, to determine whether the coverage applies, and to estimate the amount of liability the insurer has for the damage. Similarly, if the insured party has liability coverage for third party bodily injuries, information can then be collected to determine whether anyone else was injured in the accident, to determine whether the coverage applies, and to estimate the amount of liability the insurer has for the injuries.

The insurance-related action may also comprise identifying at least one insurance policy that is available to offer to an entity from amongst a plurality of candidate insurance policies. For example, the insurance product model and the supplemental policy-specific data are used to determine appropriate candidate insurance policy or policies for the entity being insured. By another optional approach, the insurance-related action may comprise providing information to a user regarding which risk units are permitted to be covered by a given corresponding insurance policy. Further, the insurance-related action may comprise at least one of storing;
amending;
terminating;
reinstating;
pricing;
auditing; and/or
reporting on
    a corresponding insurance policy.

Figure 5:
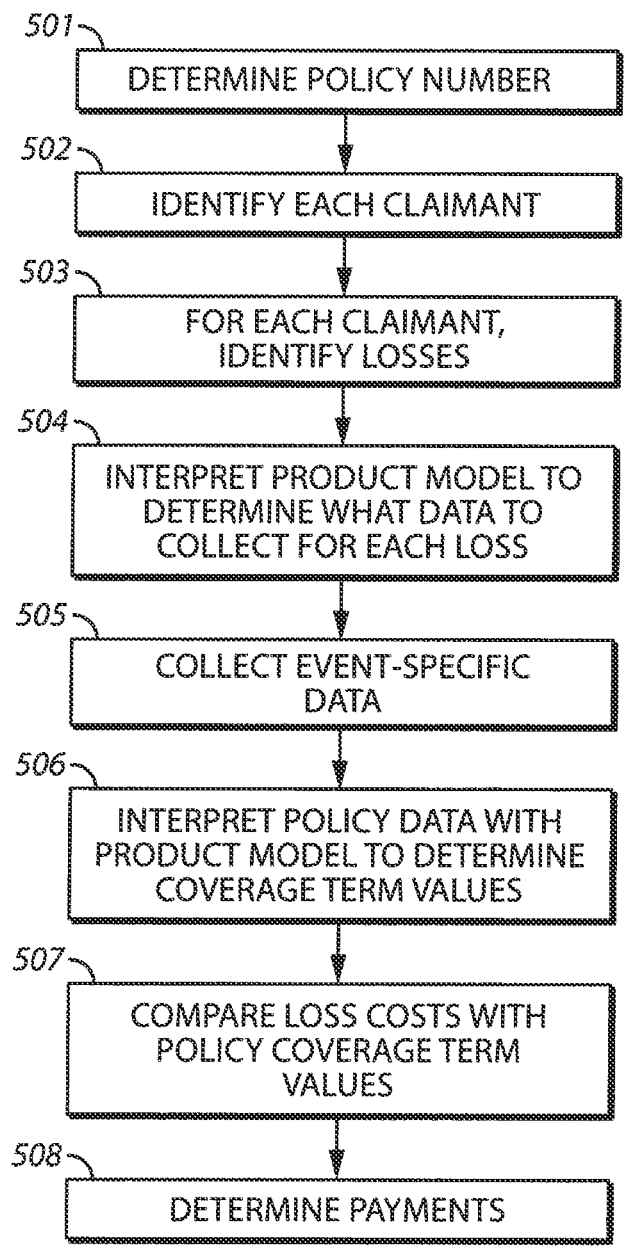
FIG. 5 comprises a block diagram as configured in accordance with various embodiments of the invention.

FIG. 5 illustrates an optional approach to substantively interpret the product model and policy-specific data to facilitate actions taken in response to a loss event. The process 500 begins when an insured entity contacts the insurer with a report of a loss. The insurer must first determine 501 the policy number, either by collecting the policy number from the insured entity, or by searching for the policy number by using the insured entity's name or other identifying information. Once the policy has been identified, the insurer must identify 502 each claimant. Next, the losses for each claimant must be identified 503. Each loss must be associated with one or more coverages. By one approach, the association may be accomplished with reference to a mapping established as part of the product model. The mapping will link kinds of loss (for example, auto damage or personal injury) with specific coverages associated with the policy.

Upon interpreting 504 the product model to determine what data to collect for each loss, the insurer will then collect 505 the event-specific data for each coverage. The policy data is then interpreted 506 with the product model to determine coverage term values. The loss costs associated with the event-specific data are then compared 507 to the coverage term values to determine 508 the actual monetary limits of liability and deductibles that apply to the payment to be made for each exposure. For example, if the policy provides a coverage for collision damage, the product model will be queried to determine the value of the selected deductible item; this value can automatically be subtracted from a payment to be made against the collision damage coverage. The policy-specific data defines the set of active coverages and applicable terms; the product model can be used to provide additional information about the coverages to assist in collecting the necessary data to make a payment determination. In the case of the collision damage coverage, the insurer will tally costs related to repairing the collision damage, segregating those costs from other costs associated with the claim (which may be covered under a different coverage, with its own limits, deductible, and other terms).

Figure 6:
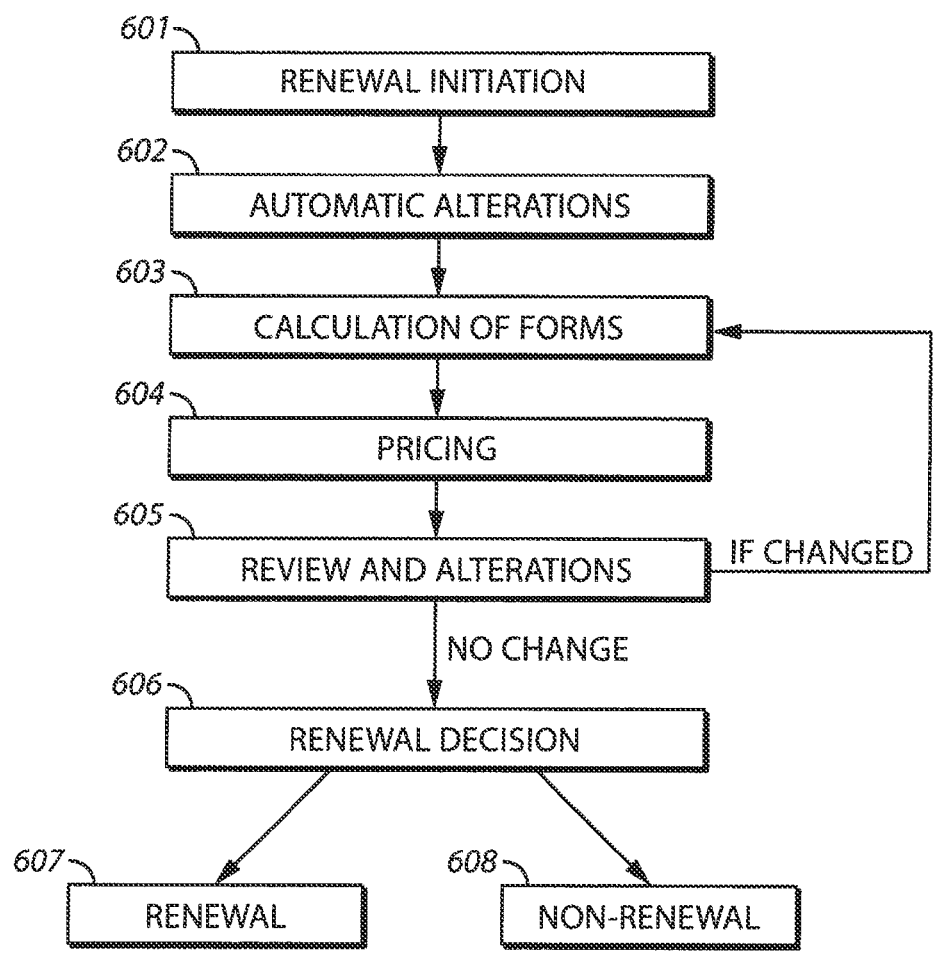
FIG. 6 comprises a block diagram as configured in accordance with various embodiments of the invention.

FIG. 6 illustrates an optional approach to substantively interpret the product model and policy-specific data to facilitate actions taken for renewing a policy. The process 600 begins with renewal initiation 601, which occurs when the system identifies a policy which is ready for renewal, based on interpreting the product model to determine the renewal lead time (before expiration) for each product type and jurisdiction. Policy-specific data may be consulted to determine whether to renew the policy (i.e., issue the renewal policy) or to non-renew the policy (i.e., refuse to issue a new policy for the renewal term), for example, based on a history of losses kept as part of the policy-specific data. If the decision is made to renew the policy, the system will create a new set of policy-specific data for the renewal term based on copying the data from the expiring term and adjusting the dates. Next, the system will make any necessary automatic alterations 602 by comparing the policy-specific data to the product model governing that type of product as of the renewal effective date to see if any changes have occurred which would require automatic alterations. For example, a new mandatory coverage for terrorism could have been added to the product model and this should automatically be added to the policy-specific data for the renewal term. Next, the system interprets the product model to recalculate 603 the set of forms needed for the written form of the policy contract document for the renewal term; these forms change from time to time and could be different from those used for the expiring period. After pricing 604 the renewal policy, the system makes it available for users to review and alter 605 prior to issuance. If a user elects to make alterations or changes, the product model is interpreted to govern the options available, as was previously described for creation of a new policy, e.g., by showing the list of available coverage term options if the user wishes to change a coverage term. Finally, once the user is finished editing, the system recalculates the forms (as described above) to take account of any changes introduced by the user.

Figure 2:
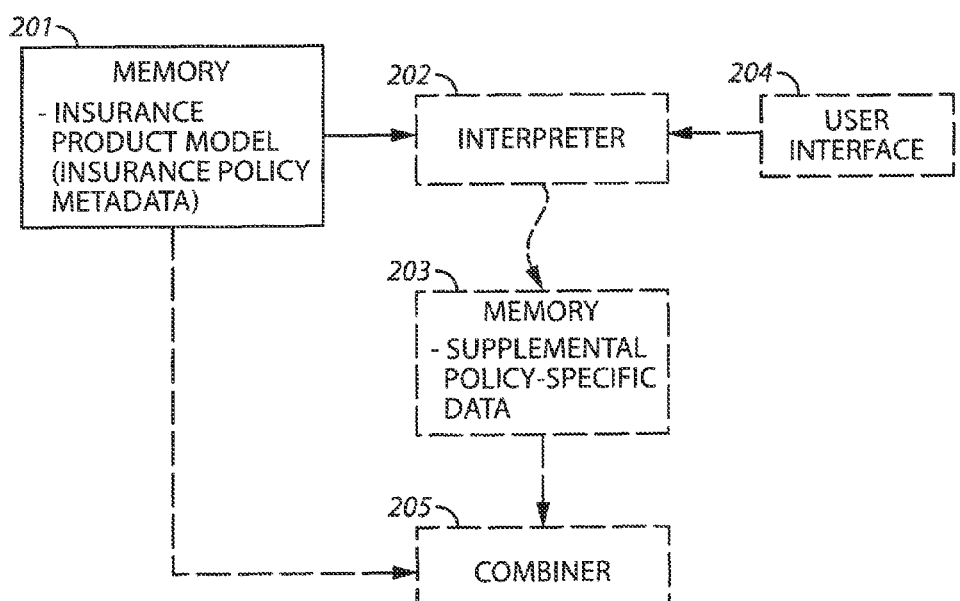
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided. FIG. 2 generally depicts pertinent portions of an apparatus 200 for facilitating an insurance-related action. This apparatus 200 includes generally a computer memory 201 operably coupled to an interpreter 202.

The computer memory 201 has stored therein an insurance product model comprising insurance policy metadata. The insurance policy metadata may comprise, at least in part, data that defines elements of a corresponding insurance policy. Further, the insurance policy metadata may also comprise, at least in part, data that is common to a plurality of derived insurance policies. Examples of metadata include, but are not limited to, data that defines a policy line, at least one risk unit type, insurance coverage types, and so forth.

An interpreter 202 is operably coupled to the computer memory. The interpreter 202 is configured and arranged to substantively interpret the insurance product model to thereby facilitate obtaining supplemental policy-specific data. The supplemental policy-specific data may be stored within a second computer memory 203 operably coupled to the interpreter 202. In addition, this second computer memory 203 may be physically and logically discrete with respect to the computer memory. A user interface 204 may be operably coupled to the interpreter 202 to thereby facilitate obtaining the supplemental policy-specific data from a user. A variety of user-interfaces are available and well-known in the art and may include, for example, a user display and a user input such as a keyboard and cursor control interface of choice.

A combiner 205 may be operably coupled to receive the insurance product model and the supplemental policy-specific data. The combiner 205 may be configured and arranged to then use the product model in combination with the supplemental policy-specific data to define a corresponding insurance policy that comprises one of a plurality of candidate insurance products that correspond to the insurance product model.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

The teachings, as set forth above, provide for an insurance product model that is defined separately and independently from the policy-specific data. As a result, any new lines of insurance coverage, coverage types, or risk units will not need to be hardcoded such that coding edits must be made every time new information is acquired or changes must be made. Rather, the independent definition of the product model and the policy data allows generic systems to perform insurance-related operations by referring to the product model to determine what information to present to the user and what information needs to be collected to carry out the operation. As a result, the above-described approach provides for the effective and efficient facilitation of an insurance-related action.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of insurance policy configuration, comprising:
   presenting, using a processor, a user interface control to a user to obtain a user input indicating policy-specific information for an insurance policy, the policy-specific information including a risk unit;
   receiving, using the processor, the user input via the user interface control;
   interpreting, using the processor, an insurance product model to determine a relevant policy option information applicable to the policy-specific information indicated by the user input, the insurance product model comprising insurance policy coverage data that includes a plurality of policy patterns, and relationships between at least some of the plurality of policy patterns, wherein interpreting the insurance product model to determine the relevant policy product includes using the policy patterns, relationships between at least some of the plurality of policy patterns, and the policy specific information to determine the relevant policy option information as defined by the insurance product model; and
   displaying the relevant policy option information to the user.

2. The method of claim 1, wherein the relevant policy option information is displayed to the user in connection with a second user interface control; and
   the method further comprising receiving, via the second user interface control, a second user input specifying additional policy-specific information.

3. The method of claim 1, the insurance product model includes metadata specifying a structure of a plurality of derived policies.

4. The method of claim 1, wherein:
   the insurance product model defines a plurality of policy elements; and
   interpreting the insurance product model to determine relevant policy option information applicable to the policy-specific information indicated by the user input includes determining appropriate values for the plurality of elements.

5. The method of claim 1, wherein the relevant policy option information includes applicable coverages.

6. The method of claim 5, wherein interpreting the insurance product model to determine relevant policy option information applicable to the policy-specific information indicated by the user input includes identifying an applicable coverage suggested for inclusion.

7. The method of claim 5, wherein interpreting the insurance product model to determine relevant policy option information applicable to the policy-specific information indicated by the user input includes identifying an applicable coverage available as an additional coverage by specific user request.

8. The method of claim 1, wherein the user input includes a jurisdiction.

9. The method of claim 1, wherein:
the user input includes a jurisdiction; and
interpreting the insurance product model to determine relevant policy option information applicable to the policy-specific information indicated by the user input includes using the jurisdiction to determine the relevant policy option information.

10. The method of claim 1, wherein the user input includes effective date information.

11. The method of claim 1, wherein:
the user input includes effective date information; and
interpreting the insurance product model to determine relevant policy option information applicable to the policy-specific information indicated by the user input includes using the effective date information to determine the relevant policy option information.

12. The method of claim 1, wherein the user input includes an underwriting entity.

13. The method of claim 1, wherein:
the user input includes an underwriting entity; and
interpreting the insurance product model to determine relevant policy option information applicable to the policy-specific information indicated by the user input includes using the underwriting entity to determine the relevant policy option information.

14. The method of claim 1, wherein interpreting the insurance product model to determine relevant policy option information applicable to the policy-specific information indicated by the user input includes determining renewal information.

15. The method of claim 1, further comprising using the insurance product model to facilitate an insurance-related action.

16. The method of claim 1, wherein:
the plurality of policy patterns include a risk unit pattern and a coverage term pattern;
the relationships include a relationship between the risk unit pattern and the coverage term pattern; and
the plurality of policy patterns and relationships between at least some of the plurality of policy patterns define a plurality of allowable combinations of policy elements associated with a policy product, the plurality of allowable combinations of policy elements including a plurality of allowable coverages, a plurality of allowable coverage terms associated with the plurality of allowable coverages, and a plurality of allowable coverage term values associated with the plurality of allowable coverage terms.

17. The method of claim 1, wherein the relevant policy option information relate to coverage terms or an available endorsement associated with the inputted risk unit.

18. A system for configuring insurance policy, comprising:
a processor configured to:
present a user interface control to a user to obtain a user input indicating policy-specific information for an insurance policy, the policy-specific information including a risk unit;
receive the user input via the user interface control;
interpret an insurance product model to determine a relevant policy option information applicable to the policy-specific information indicated by the user input, the insurance product model comprising insurance policy coverage data that includes a plurality of policy patterns, and relationships between at least some of the plurality of policy patterns, wherein interpret the insurance product model to determine the relevant policy product includes use the policy patterns, relationships between at least some of the plurality of policy patterns, and the policy specific information to determine the relevant policy option information as defined by the insurance product model; and
display the relevant policy option information to the user.

19. The system of claim 18, wherein the relevant policy option information is displayed to the user in connection with a second user interface control; and
wherein the processor is further configured to receive, via the second user interface control, a second user input specifying additional policy-specific information.

20. The system of claim 18, the insurance product model includes metadata specifying a structure of a plurality of derived policies.

21. The system of claim 18, wherein:
the insurance product model defines a plurality of policy elements; and
interpreting the insurance product model to determine relevant policy option information applicable to the policy-specific information indicated by the user input includes determining appropriate values for the plurality of elements.

22. The system of claim 18, wherein the relevant policy option information includes applicable coverages.

23. The system of claim 18, wherein the user input includes a jurisdiction.

24. The system of claim 18, wherein the user input includes effective date information.

25. The system of claim 18, wherein the user input includes an underwriting entity.

26. The system of claim 18, wherein interpreting the insurance product model to determine relevant policy option information applicable to the policy-specific information indicated by the user input includes determining renewal information.

27. The system of claim 18, wherein the processor is further configured to use the insurance product model to facilitate an insurance-related action.

28. A computer program product for configuring insurance policy, the computer program product being embodied in a non-transitory computer readable storage medium and comprising computer instructions for:
presenting a user interface control to a user to obtain a user input indicating policy-specific information for an insurance policy, the policy-specific information including a risk unit;
receiving the user input via the user interface control;
interpreting an insurance product model to determine a relevant policy option information applicable to the policy-specific information indicated by the user input, the insurance product model comprising insurance policy coverage data that includes a plurality of policy patterns, and relationships between at least some of the plurality of policy patterns, wherein interpreting the insurance product model to determine the relevant policy product includes using the policy patterns, relationships between at least some of the plurality of policy patterns, and the policy specific information to determine the relevant policy option information as defined by the insurance product model; and displaying the relevant policy option information to the user.

29. The computer program product of claim 28, wherein the relevant policy option information is displayed to the user in connection with a second user interface control; and further comprising computer instructions for receiving, via the second user interface control, a second user input specifying additional policy-specific information.

30. The computer program product of claim 28, the insurance product model includes metadata specifying a structure of a plurality of derived policies.

31. The computer program product of claim 28, wherein:

the insurance product model defines a plurality of policy elements; and interpreting the insurance product model to determine relevant policy option information applicable to the policy-specific information indicated by the user input includes determining appropriate values for the plurality of elements.

32. The computer program product of claim 28, wherein the relevant policy option information includes applicable coverages.

33. The computer program product of claim 28, wherein the user input includes a jurisdiction.

34. The computer program product of claim 28, wherein the user input includes effective date information.

35. The computer program product of claim 28, wherein the user input includes an underwriting entity.

36. The computer program product of claim 28, wherein interpreting the insurance product model to determine relevant policy option information applicable to the policy-specific information indicated by the user input includes determining renewal information.

37. The computer program product of claim 28, further comprising computer instructions for using the insurance product model to facilitate an insurance-related action.

* * * * *